(12) United States Patent
Wells et al.

(10) Patent No.: US 6,469,783 B1
(45) Date of Patent: Oct. 22, 2002

(54) SOLID STATE MODULATED BEACON TRACKING SYSTEM

(75) Inventors: Michael L. Wells, Hawthorne, CA (US); John A. Tyson, Lawndale, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/838,064

(22) Filed: Apr. 19, 2001

(51) Int. Cl.[7] ............ G01B 11/26; G01C 1/00; F41G 7/00; F42B 10/00; F42B 15/01; G06F 19/00
(52) U.S. Cl. ............ 356/139.05; 244/3.16; 244/3.11
(58) Field of Search .............. 244/3.11–3.16; 342/90, 96, 97; 356/139.04–139.09

(56) References Cited

U.S. PATENT DOCUMENTS

| | | | | |
|---|---|---|---|---|
| 2,930,894 A | * | 3/1960 | Bozeman ............ 250/203 |
| 3,820,742 A | * | 6/1974 | Watkins ............ 244/3.11 |
| 3,876,308 A | * | 4/1975 | Alpers ............ 356/152 |
| 3,974,383 A | * | 8/1976 | Chapman ............ 250/342 |
| 4,038,547 A | * | 7/1977 | Hoesterey ............ 250/338 |
| 4,047,816 A | * | 9/1977 | Pell et al. ............ 356/152 |
| 5,062,586 A | * | 11/1991 | Hobson et al. ............ 244/3.12 |
| 5,651,512 A | * | 7/1997 | Sand et al. ............ 244/3.11 |
| 6,123,287 A | * | 9/2000 | Bozeman et al. ............ 244/3.11 |

* cited by examiner

*Primary Examiner*—Thomas H. Tarcza
*Assistant Examiner*—Brian Andrea
(74) *Attorney, Agent, or Firm*—Colin M. Raufer; Leonard A. Alkov; Glenn H. Lenzen, Jr.

(57) ABSTRACT

A system (16) for tracking a missile (22) in flight, the missile (22) having an optical beacon generator (32) that outputs a modulated signal (26) having a predetermined frequency, including an optical system (50, 52, 54) for transmitting image data along an optical path (68) onto an array of detectors (55), such that each detector in the array (55) receives substantially simultaneously the image data from the optical system (50, 52, 54). The system (16) further includes means for processing (46) the image data transmitted onto the array of detectors (55) in order to locate the optical beacon (32).

20 Claims, 5 Drawing Sheets

SOLID STATE MODULATED BEACON TRACKING SYSTEM

TECHNICAL FIELD

The present invention relates generally to a missile tracking system. More particularly, the present invention relates to a system for tracking an optical beacon located on the missile, which uses a solid state imaging array in conjunction with conventional digital processing electronics.

BACKGROUND OF THE INVENTION

There are missiles, such as the TOW missile (tube-launched, optically-tracked, wire-guided missile), that do not include on-board tracking electronics. As a result, such missiles require input of target tracking information from a tracking system that i typically located on a platform (e.g., helicopter) from which the missile is launched.

Typically, such a system includes a target designator, which defines a boresight or line of sight (LOS) from the missile's launch position to the target. The tracking system gathers information necessary to track the missile, thereby permitting a guidance system to guide the missile along this defined boresight or LOS to the target using a closed-loop control strategy. Specifically, the tracking system gathers information it uses to calculate error signals that are indicative of the relationship between the actual flight path of the missile and the LOS. As the missile moves away from the LOS, the error signals increase, and as the missile moves closer to the LOS, the error signals decrease. The tracking system uses these error signals to calculate an angular displacement measurement (i.e., angle-off-boresight) that it then outputs to a navigation or guidance system. In turn, the navigation or guidance system, in conjunction with an autopilot system, uses the angular displacement measurement in accordance with a guidance law to guide the missile down the boresight to the target.

Tracking systems generally track an optical signal generated by an optical beacon generator located on the missile. The tracking systems generally include an optical system that is used to gather image data, and generally is made up of a series of lenses or prisms that focus the image data on an array of detectors. Electronic in the tracking system process the image data focused on the array in order locate the optical signal emitting from the missile. Historically, the series of lenses or prisms have included a motor driven mirror or prism. The motor driven mirror or prism is rotated in order to "scan" the focused image data across an "L" shaped detector array, a process necessary to enable the electronics to determine the azimuth and elevation signals needed to calculate the angular displacement. Although these prior systems have proven effective, they do suffer from two main drawbacks.

First, in order to rotate the mirror or prism, the implementation requires the use of a motor and associated geartrain assembly, both of which are susceptible to wear and mechanical failure.

Second, the system requires an aperture (generally having a diameter of three inches) that may be too large for certain platforms, such as airborne platforms. The larger diameter aperture used in these systems is necessary in order to maintain an adequate Signal-to-Noise ratio for the received image signal or data, particularly at the maximum range of the missile. Specifically, because the image data is scanned across the detector array, each individual detector receives data for only a short period of time. The short dwell time on an individual detector provides limited time to integrate the image data for purposes of noise averaging. As a result, a stronger signal is needed to maintain an adequate Signal-to-Noise ratio Accordingly, it would be desirable to have a missile tracking system that did not suffer from these drawbacks. In particular, it would be desirable to have a missile tracking system that did not require a rotating mirror or prism to scan image data across the array. Furthermore, it would be desirable to have a missile tracking system that could maintain an adequate Signal-to-Noise ratio using an aperture that had a sufficiently small diameter to make it potentially suitable for all platforms on which the tracking system may be used.

SUMMARY OF THE INVENTION

The present invention provides a missile tracking system that employs an optical system, which is stationary in relation to the detector array on which it is focusing image data. In other words, an optical path along which the image data travels is fixed between the optical system of the tracker and the detector array. Furthermore, the present invention provides a missile tracking system that can maintain an adequate Signal-to-Noise ratio using an aperture having a diameter of one to two inches.

In accordance with one aspect of the present invention, a system is provided for tracking a missile in flight, in which the missile has an optical beacon generator that outputs a modulated signal having a predetermined frequency. The tracking system includes an optical system for transmitting image data along an optical path onto an array of detectors, such that each detector in the array receives substantially simultaneously the image data from the optical system, and a means for processing the image data transmitted onto the array of detectors in order to locate the optical beacon.

In accordance with another aspect of the invention, a system for tracking a missile is provided in which the means for processing samples the image data at a first frequency during a first portion of the flight of the missile and at a second frequency during a second portion of the flight of the missile.

In accordance with still a further aspect of the present invention, a system is provided for tracking a missile in flight, in which the missile has an optical beacon generator that outputs a modulated signal having a predetermined frequency. The tracking system includes an optical system for transmitting image data along an optic path onto an array of detectors, in which the optical path remains fixed between the optical system and the array. The tracking system also includes means for processing the image data transmitted onto the array of detectors in order to locate the optical beacon.

In accordance with still another aspect of the present invention, a system is provided far guiding and tracking a missile in flight, in which the missile has an optical beacon generator that outputs a modulated signal having a predetermined frequency. This guiding and tracking system includes means for establishing an ailment for the missile and means for transmitting image data along an optical pat onto an array of detectors such that each detector receives the image data substantially simultaneously. The system also includes means for processing the image data transmitted onto the array of detectors in order to establish a position of the optical beacon relative to the aimpoint and means for guiding the missile to he aimpoint in response to the position of the optical beacon relative to the aimpoint

DESCRIPTION OF THE PREFERRED EMBODIMENTS

Figure 1:
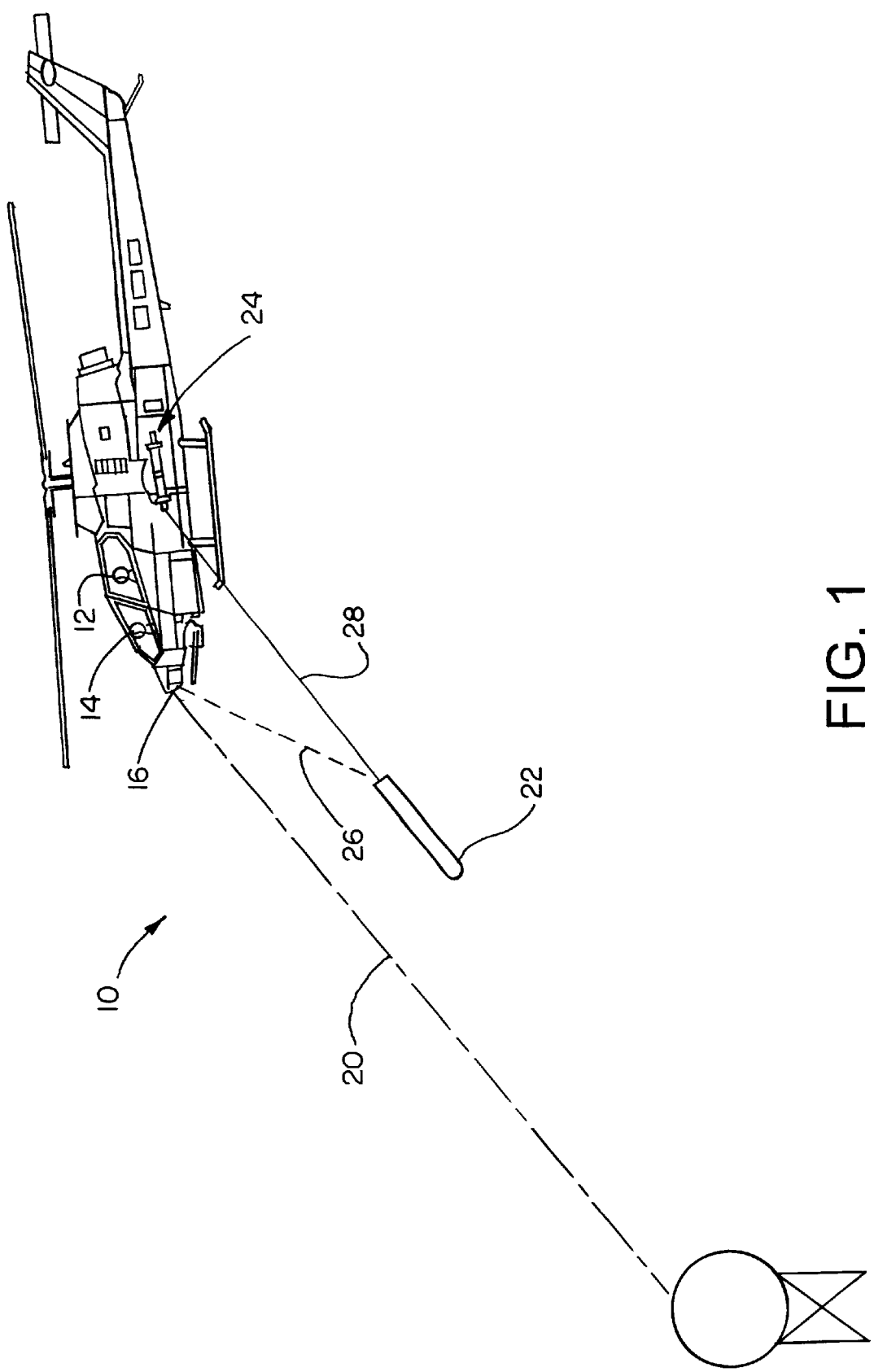
FIG. 1 is a side elevational view of an aircraft in which the present invention is implemented.

The preset invention will now be described in detail with reference to the drawings. In the drawings, like reference numerals are used to refer to like elements throughout.

FIG. 1 illustrates a side view of a helicopter 10, such as a Cobra attack helicopter, in which the present invention is implemented. It should be recognized that this invention could be implemented on other airborne or land-based platforms, which require a missile tracking system. As is shown in FIG. 1, pilot 12 flies the helicopter 10. During flight, a system operator, or gunner 14, uses optics within a tracking and guidance system, shown generally as 16, to locate a missile target 18. The optic could be a television camera, direct view optics, or even a Forward Looking Infrared Sensor. After the target 18 is detected, as represented by dashed line 20, the gunner 14 places a reticule of the optics, such as a cross-hairs, on the target 18 and fires the missile 22 from launcher 24.

As will be described in more detail below, after the missile 22 is launched, a tracking signal, generally represented by dashed line 26, is emitted from the missile 22. In the present invention, the tracking signal 26 is a modulated optical signal produced by an optical beacon generator located on the missile 22. The tracking signal 26 is detected and processed by the tracking and guidance system 16 The tracking and guidance system 16 uses the processed tracking signal to compute guidance information, which is transmitted to the missile 22 in order keep the missile 22 on course to the target 18. In the illustrated implementation, the guidance information is transmitted to the missile 22 via wire 28. However, one skilled in the art will recognize that the guidance information could also be transmitted via a wireless connection, such as a RF link, if the missile 22 and the tracking and guidance system 16 were so configured.

Figure 2:
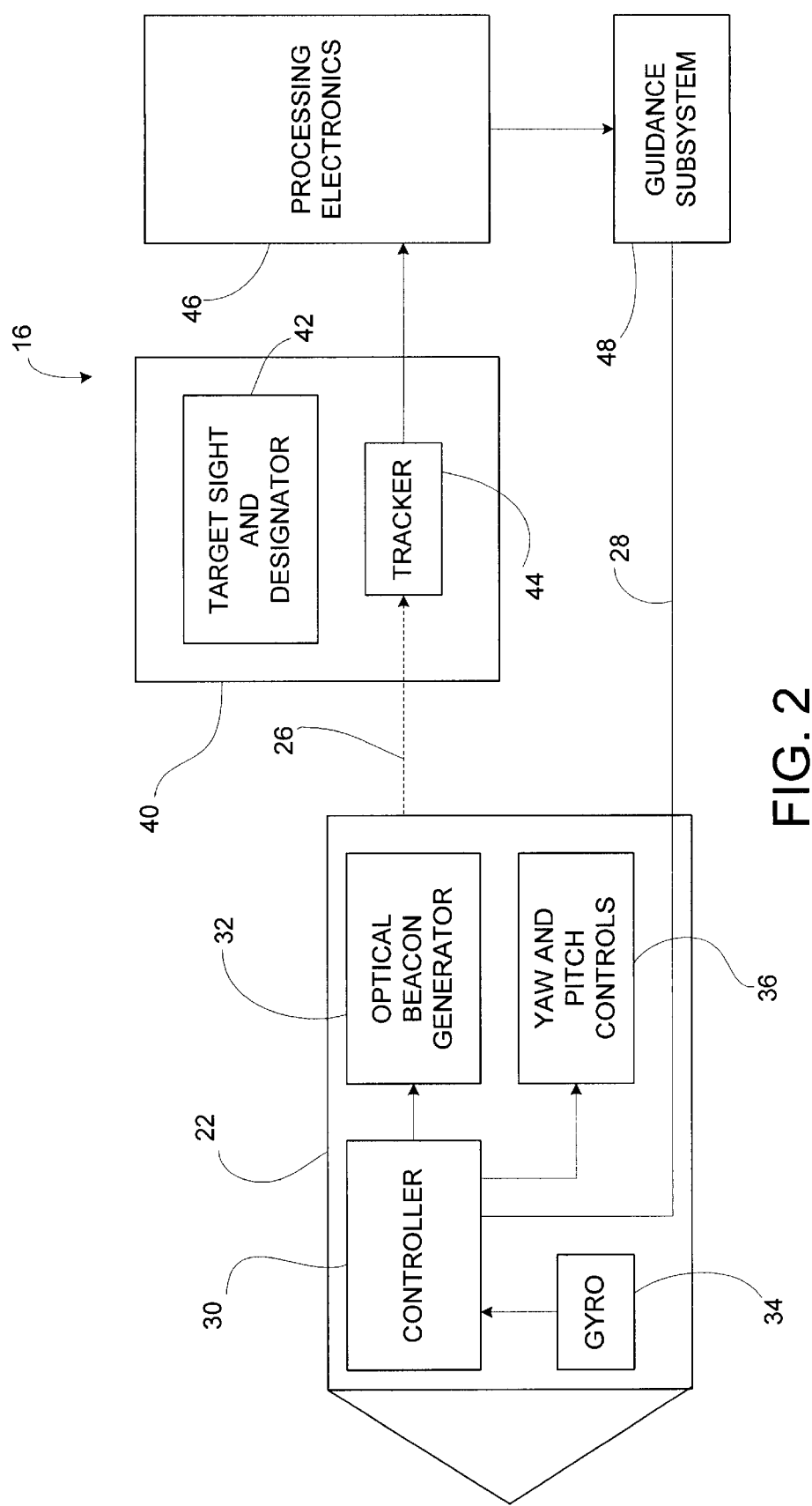
FIG. 2 is a simplified block diagram illustrating a missile tracking system in accordance with the present invention.

Referring now to FIG. 2, the interrelation of the functional components of the missile 22 and the tracking and guidance system 16 is illustrated in block form. The missile 22 includes a controller 30 coupled to an optical beacon generator 32. The controller 30 is also coupled to a gyro 34 and yaw and pitch controls 36. The gyro 34 is used to spin stabilize the missile 22 after launch, while the yaw and pitch controls 36 are used to guide the missile 22 along its desired flight path.

The tracking and guidance system 16 includes a targeting system 40 having target sight and designator 42 and tracker 44. The targeting system 40 is mounted on some form of gimbal (not shown) in order that it be rotatable, such that the optics associated with the target sight and designator 42 and the tracker 44 move in correspond ding relation to each other. The tracker 44 of the targeting system 40 is coupled to the processing electronics 46, which are in turn coupled to the guidance subsystem 48. In the illustrated embodiment, the guidance subsystem 48 is connected to the controller 30 via wire 28. However, as mentioned previously, the wire 28 could be replaced by a transmitter located in the guidance subsystem and a receiver located in the missile 22 for providing communication between the guidance subsystem 48 and the missile 22.

As discussed above, in operation, the gunner 14 sights the target 18 using the target sight and designator 42 and places cross-hairs on the target 18. The cross-hairs define the target line-of-sight (LOS) or boresight 20. It may be the gunner's 14 responsibility to maintain the cross-hairs on the target 18 during the flight of the missile 2 since it is the boresight 20, which will define the flight path of the missile 22, although an automatic target tracking scheme could be employed. In other words, the tracking and guidance system 16 is configured such that it will fly the missile 22 down the boresight 20 to the target 18.

Figure 3:
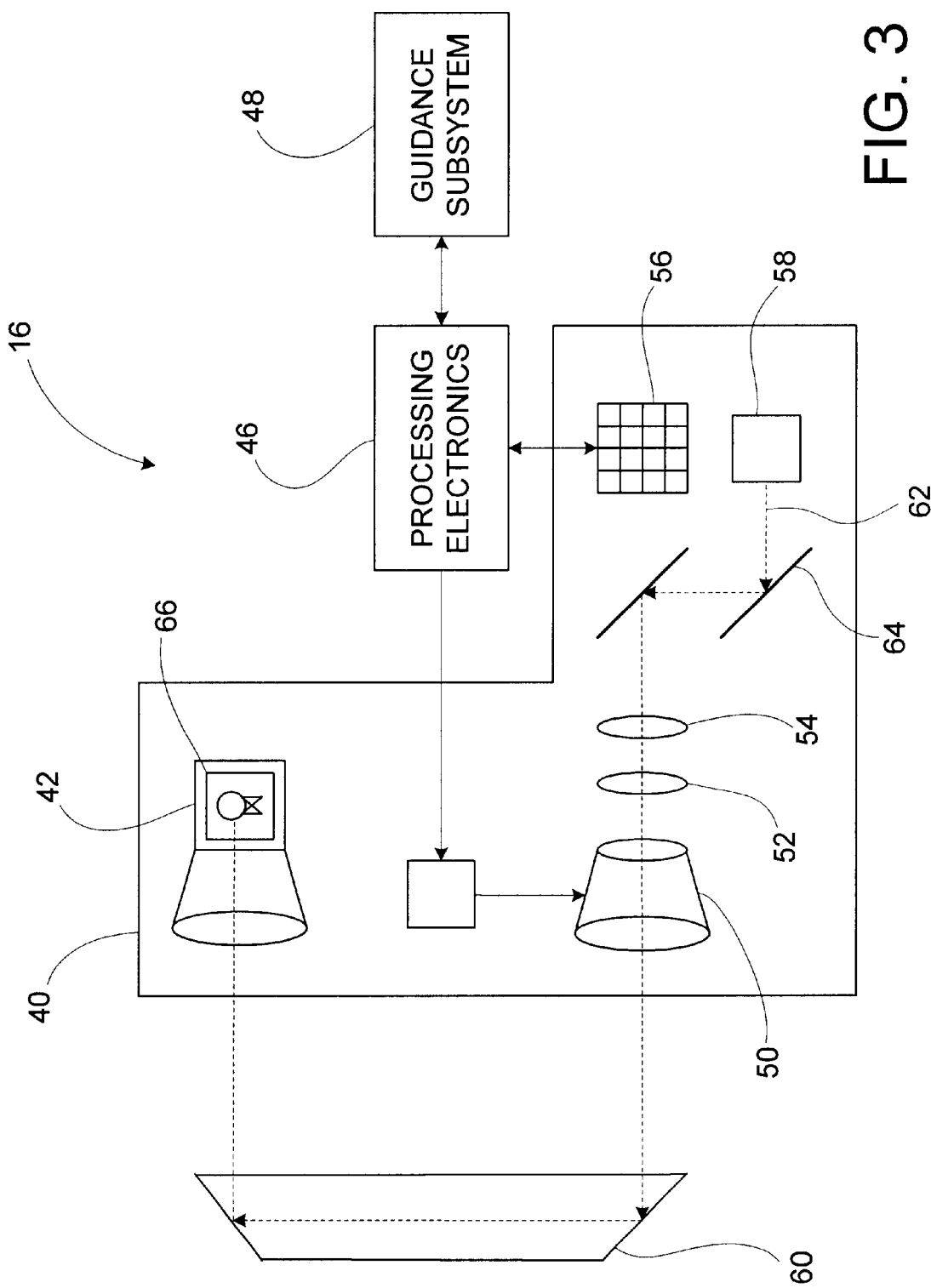
FIG. 3 is a schematic diagram illustrating the functional components of a missile tracking system in accordance with the present invention in conjunction with a boresight transfer prism used to align a boresight source to an aiming camera.

In order for the tracking and guidance system 16 to perform its intended function, the boresight 20 must be calibrated to the tracker 44 and the target sight and designator 42. Referring now to FIG. 3, the hardware needed to calibrate the boresight 20 to the target sight and designator 42 is illustrated. In the illustrated embodiment, the target sight and designator 42 is a television camera. The tracker 44 includes telescope 50, imaging lenses or prisms 52 and 54, and imaging array 56. To calibrate the boresight 20 to the target sight and designator 42, a boresight source 58 is used. The boresight source 58 is generally a light emitting diode, but could be any other device with is capable of outputting a point source of light. The calibration process for the target sight and designator 42 is generally performed when power is supplied to the targeting system 40. When the targeting system 40 is "powered-up," it is rotated automatically into temporary alignment with a boresight transfer prism 60 and the boresight source 58 is energized. The boresight source 58 emits a light beam, represented by dashed line 62, which is guided by a beam splitter 64 through the imaging lenses 52 and 54, and telescope 50 to the boresight transfer prism 60. The boresight transfer prism 60, as its name suggests, transfers the light beam 62 to a sensor of the target sight and designator 42. The target sight and designator 42 determines where the light beam 62 is hitting the sensor and places cross-hairs on the screen 66 of the target sight and designator 42 indicative of the location of the light beam 62. The cross-hairs are then stored on the screen 66 until power is removed from the targeting system 40.

In addition to being calibrated to the target sight and designator 42, the boresight 20 must also be calibrated to the center of the imaging array 56. This calibration is generally performed at the factory. To perform this calibration, a mirror or retroreflector prism (not shown) is placed in front of the telescope 50. As described above, the boresight source 58 is energized and its light beam 62 is transmitted to the mirror, which reflects light beam 60 back through the telescope 50 and imaging lenses 52 and 54 to the imaging array 56. A mechanical alignment is then per in order to align the boresight 20 to the center of the imaging array 56. In order to improve the accuracy of the tracking and guidance system 16, a subpixel alignment is performed using software offsets that are then stored in the processing electronics 46. Ideally, the light beam 62 of the boresight source 58 is modulated at the same frequency as the modulation of the signal 26 output by the optical beacon generator 32 since the processing electronics are programmed to track a point source of light at that modulated frequency. Accordingly, modulating the light beam 62 negates the need to use different software for calibrating the boresight 20 to the imaging array 56 than is used to track the signal 26 output by the optical beacon generator 32.

Figure 4:
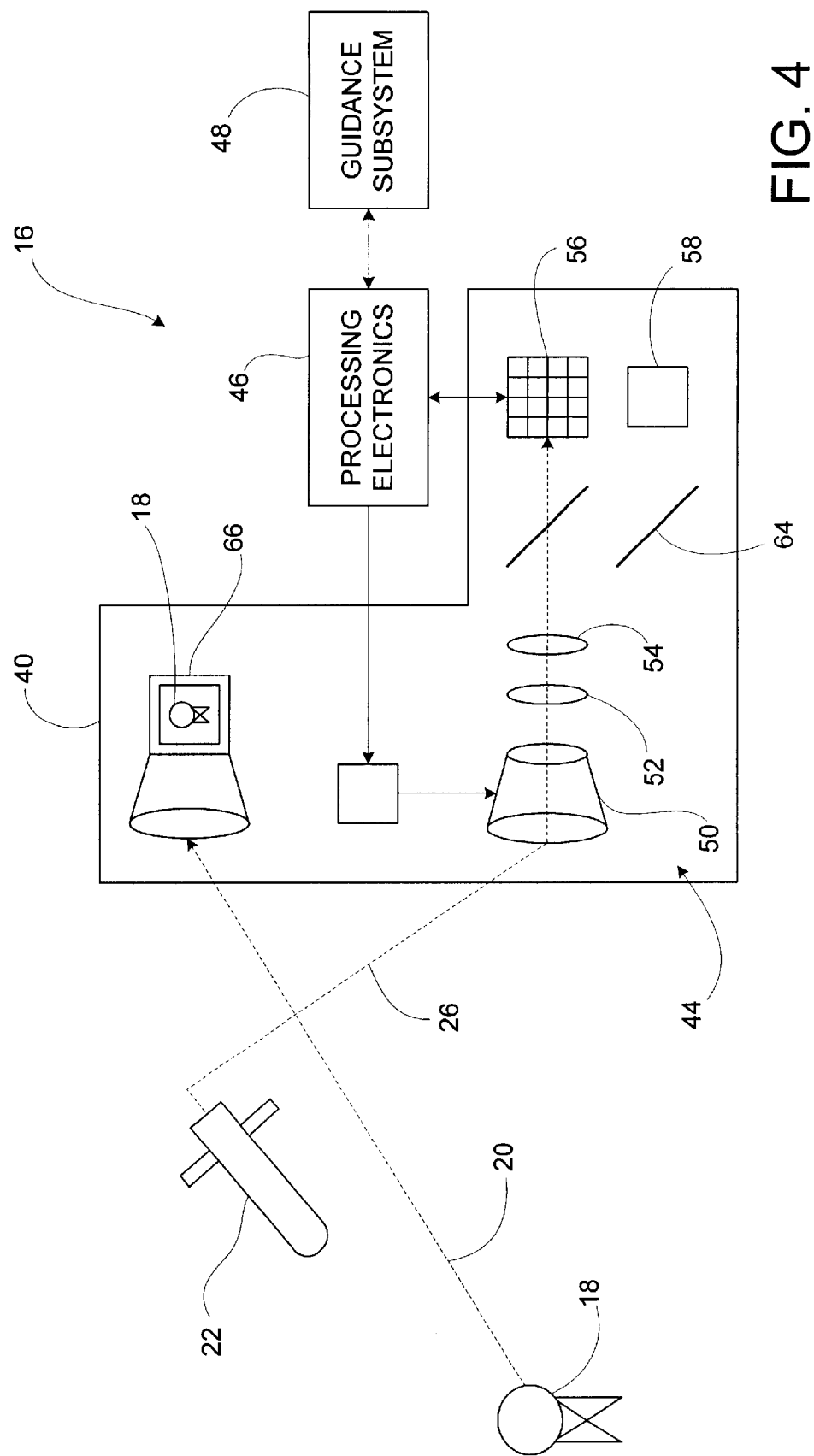
FIG. 4 is a schematic diagram illustrating the functional components of a missile tracking system in accordance with the present invention.

FIG. 4 illustrates the basic operation of the functional elements of the targeting system 40. As discussed above, prior to missile launch, the gunner 14 uses the screen 66 of the target sight and designator 42 to acquire visually the target 18. After the target 18 has been acquired, the crosshairs are placed on the target 18 and held there by the gunner 14 during the flight of the missile 22. After the missile 22 has been launched, the optical beacon generator 32 is energized and outputs the tracking signal 26. The tracking signal 26 is modulated at a predetermined frequency $F_0$. One skilled in the art will recognize that the tracking signal 26 may be modulated at any frequency without departing from the scope of the Present invention. However, in order to diminish the missile's susceptibility to countermeasures in the field, the value for Of is generally closely controlled.

After launch, the missile 22 quickly comes into the field of view of the tracker 44, which is looking for the tracking signal 26. The tracking signal 26, along with other image data captured by the tracker 44, is focused by the telescope 50 and the imaging lenses 52 and 54 onto imaging array 56. In this embodiment of the present invention, telescope 50 is a simple telescope that has first and second fields of view, with the first field of view being wider than the second field of view. The imaging array 56 is an InGaAs array that is commercially available and generally used in high speed cameras.

As will be described in more detail below, the processing electronics 46 sample the image data focused on the imaging array 56 in order to locate the tracking signal 26. The processing electronics 46 determine the position of the tracking signal 26 and hence the position of the missile 22 in relation to the center of the imaging array 56, which as discussed previously has been calibrated as the boresight 20 location. Based on this information, the processing electronics 46 provide information about the relative position of the missile 22 to the guidance subsystem 48, which then communicates guidance information to the missile 22.

The process steps associated with tracking and guiding the missile 22 to the target 18 will now be explained in more detail by reference to FIG. 5. As already mentioned on numerous occasions, in step 100, the gunner 14 uses the targeting system 40 to sight the target 18. After the gunner 14 sights the target 18, the missile 22 is launched.

Moving to step 102, the telescope 50 is initially set to the first field of view, i.e., the wide Field of view. The telescope 50 transmits image data to the imaging lenses 52 and 54, which in turn transmit the image data to and focus the image data on the imaging array 56. In step 104, the processing electronics 46 sample the image data received by the imaging array 56 at a first sample rate, generally on the order of 20 Hz. The processing electronics process the image data, in an effort to locate a launch signature of the missile 22. In the case of the TOW missile, the processing electronics 46 are looking for large area saturations, which are indicative the dual exhaust ports located on either side of the missile 22. The processing electronics 46 then calculate the center point of these large area saturations and assume that this is the location of missile 22. As indicated in step 106, after determining the location of the missile 22, a track box, which is a 16 by 16 pixel array, i placed around the presumed location.

Moving to step 108, the processing electronics 46 now sample the image data contained in the track box as opposed to the image data contained on the entire array. This sampling is performed at a higher rate than the rate at which the image date was sampled when looking for the large area saturations. In the present embodiment, a sample rate of 0.8 $F_0$ is used and is hereafter referred to as the Simple Frequency. The effect of sampling the image data at the Sample Frequency as opposed to the initial sample rate is improved rejection of background clutter or interference since the imaging array effectively becomes a digital band-pass filter having zero response at DC and a transmission band at a frequency equal to the difference between the modulation frequency of the tracking signal 26 and the Sample Frequency. In any event, it is generally desirable to sample the image data at some multiple of the frequency of modulation of the signal 26 in order that the signal 26 can be better distinguished from the background image data transmitted along with the image data attributable to the signal 26. Thus, one skilled in the art will recognize that sampling at rates greater than 0.8 $F_0$ does not depart from the scope of this invention.

Figure 5:
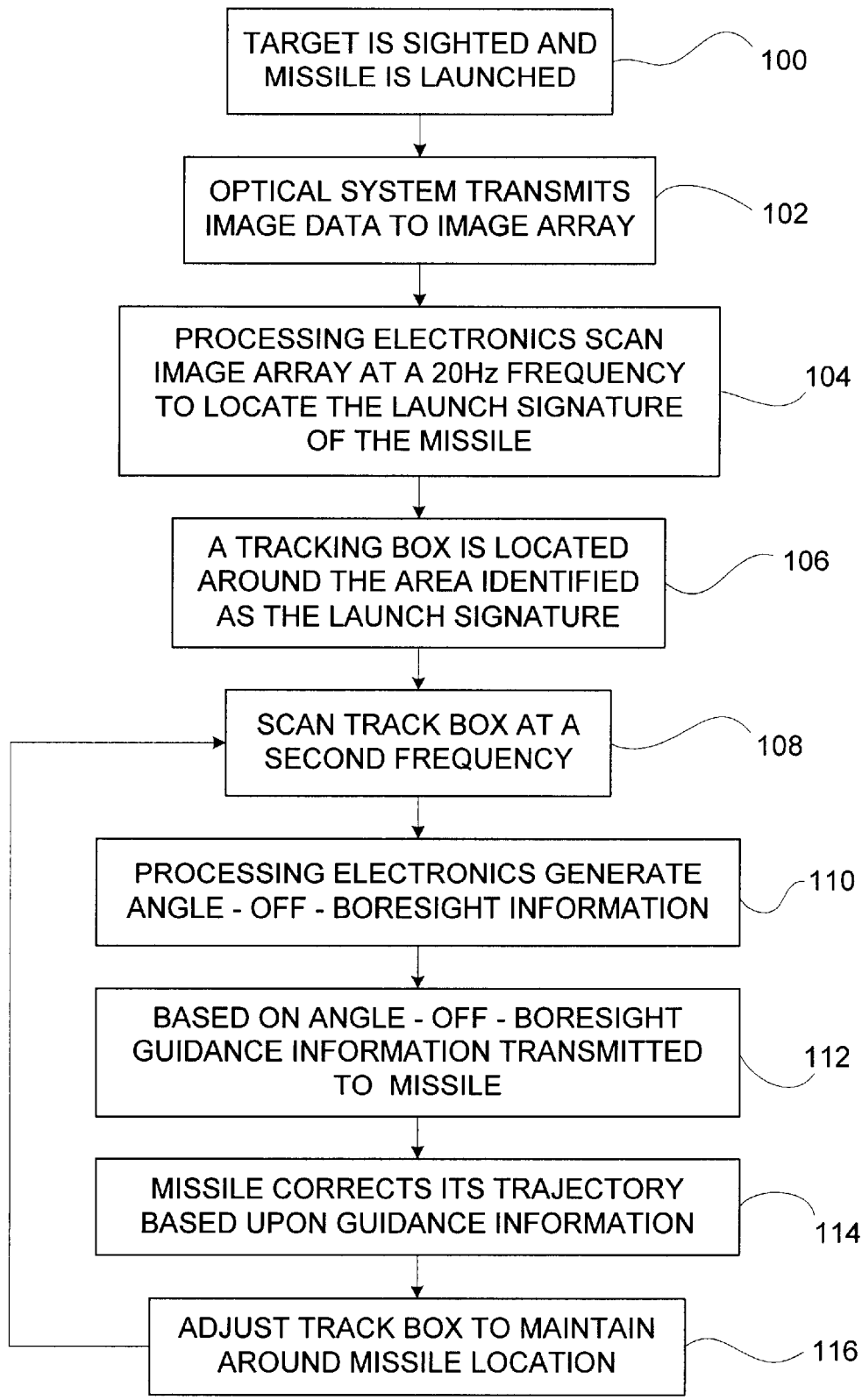
FIG. 5 is a flow chart illustrating the steps a missile tracking system in accordance with the present invention takes to track a missile, thereby enabling a guidance system used in conjunction therewith to guide the missile to a target.

Although not expressly included in the process steps illustrated in FIG. 5, at some point in time after the processing electronics have begun sampling the image data at the hi her rate, the processing electronics 46 will provide a signal to a field-of-view controller 70 to mechanically switch the telescope 50 from its first field of view to its second field of view. By switching to a narrower field of view, the strength of the tacking signal 26 received by the tracker 44 is increased because the percentage of image data transmitted by the telescope 50 attributable to the tracking signal 26 is greater in the narrower field of view than the wider field of view as the distance between the missile 22 and the tracker 44 increases. In the present embodiment, the telescope 50 is switched from a 12 degree field of view to a 1.25 degree field of view.

In step 110, the processing electronics 46 continuously process the image data within the track box in order to determine the location of the missile 22 in relation to the center of the imaging array 56. The processing electronics 46 convert the location of the missile 22 in relation to the boresight 20 to an "angle off boresight" measurement. The processing electronics then output the angle off boresight measurement to the guidance subsystem 48 for further processing.

Moving to step 112, the guidance subsystem 48 uses the angle off boresight measurement in its guidance algorithms to generate guidance information that will be used by the missile 22. The guidance subsystem 48 transmits this guidance information either via wire, RF link, or other communication means to the controller 30 of the missile 22. As indicated in step 114, the controller 3l of the missile 30 uses the guidance information and outputs commands to the yaw and pitch controls 36, thereby adjusting the flight path of the missile 22 to coincide with the boresight 20. In other words, the missile 22 is guided such that it flies down the boresight 20 to the target 18.

As indicated in step 116, the processing electronics maintain the track box around the location of the missile, and steps 108 through 116 are repeated. Ideally, in the end, the angle-off-boresight measurement calculated in step 110 becomes zero, indicting that the missile 22 is flying down the boresight 20 and to the target 18.

As is evident from the above description, the tracking and guidance system 16 of the present invention does not suffer from the drawbacks of prior tracking systems. Unlike prior tracking systems in which the optical path between the imaging optics and the detector array moved in a scanning motion in response to the rotating mirror or prism, the optics (i.e., the telescope 50 and imaging lenses 52 and 54) in the present invention are stationary and therefore the optical path between the optics and the imaging array 56 remains fixed. Accordingly, this tracking and guidance system 15 does not require the use of a motor and geartrain, both of which are susceptible to wear and mechanical failure.

Furthermore, since the optical path along which the image data travels is not scanned, each detector in the imaging array 56 receives the image data substantially simultaneously and virtually continuously. As a result, the processing electronics 46 of the present invention are better able to integrate the image data for purposes of noise averaging. Therefore, the present invention does not need the strength of signal required in prior tracking systems in order to maintain an adequate Signal-to-Noise ratio and can function properly with an aperture of one to two inches as opposed to three inches. This aperture size enables the present invention to be implemented on virtually all airborne platforms currently requiring a racking system.

Although the invention has been shown and described with respect to certain embodiments, it is obvious that equivalents and modifications will occur to others skilled in the art upon the reading and understanding of the specification.

What is claimed is:

1. A system for tracking a missile in flight, the missile having an optical beacon generator that outputs a modulated signal having a predetermined frequency, comprising:
   (a) an optical system for transmitting image data along an optical path onto an array of detectors; and
   (b) means for processing the image data transmitted onto the array of detectors in order to locate the optical beacon, wherein each detector in the array receives substantially simultaneously the image data from the optical system,
   wherein the means for processing samples the image data at a first frequency during a first portion of the flight of the missile and at a second frequency during a second portion of the flight of the missile.

2. A system in accordance with claim 1, wherein the first portion of the flight occurs prior in time to the second portion of the flight and the first frequency is lower than the second frequency.

3. A system in accordance with claim 1, wherein the first frequency is 20 Hz and the second frequency is greater than the predetermined frequency of the modulated signal.

4. A system in accordance with claim 1, wherein the first frequency is 20 Hz and the second frequency is 0.8 times the predetermined frequency of the modulated signal.

5. A system in accordance with claim 1, wherein the optical system includes at least one lens and the optical path remains fixed between the at least one lens and the array.

6. A system in accordance with claim 1, wherein the optical system includes a telescope and least one lens, and the optical path remains fixed between the telescope, the at least one lens and the array.

7. A system in accordance with claim 1, wherein the optical system has a first field of view used during a first portion of the flight and a second field of view used during a second portion of the flight.

8. A system in accordance with claim 7, wherein the first portion of the flight occurs prior in time to the second portion of the flight and the first field of view is wider than the second field of view.

9. A system in accordance with claim 8, wherein the first field of view is 12 degrees and the second field of view is 1.25 degrees.

10. A system for tracking a missile in flight, the missile having an optical beacon generator that outputs a modulated signal having a predetermined frequency, comprising:
    (a) an optical system for transmitting image data along an optical path onto an array of detectors; and
    (b) means for processing the image data transmitted onto the array of detectors in order to locate the optical beacon;
    wherein the optical path remains fixed between the optical system and the array, and the means for processing samples the image data at a first frequency during a first portion of the flight of the missile and at a second frequency during a second portion of the flight of the missile.

11. A system in accordance with claim 10, wherein the first portion of the flight occurs prior in time to the second portion of the flight and the first frequency is lower than the second frequency.

12. A system in accordance with claim 11, wherein the first frequency is 20 Hz and the second frequency is greater than the predetermined frequency of the modulated signal.

13. A system in accordance with claim 11, wherein the first frequency is 20 Hz and the second frequency is .8 times the predetermined frequency of the modulated signal.

14. A system in accordance with claim 10, wherein the optical system includes at least one lens.

15. A system in accordance with claim 10, wherein the optical system includes a telescope and at least one lens.

16. A system in accordance with claim 10, wherein the optical system has a first field of view used during a first portion of the flight and a second field of view used during a second portion of the flight.

17. A system in accordance with claim 16, wherein the first portion of the flight occurs prior in time to the second portion of the flight and the first field of view is wider than the second field of view.

18. A system in accordance with claim 17, wherein the first field of view is 12 degrees and tie second field of view is 1.25 degrees.

19. A system for guiding and tracking a missile in flight, the missile having an optical beacon generator that outputs a modulated signal having a predetermined frequency, comprising:
    (a) means for establishing an aimpoint for the missile;
    (b) means for transmitting image data along an optical path onto an array of detectors such that each detector receives the image data substantially simultaneously;
    (c) means for processing the image data transmitted onto the array of detectors in order to establish a position of the optical beacon relative to the aimpoint;
    (d) means for guiding the missile to the aimpoint in response to the position of the optical beacon relative to the aimpoint,
    wherein the means for processing samples the image data at a first frequency during a first portion of the flight of the missile and at a second frequency during a second portion of the flight of the missile.

20. A system in accordance with claim 19, wherein the means for transmitting includes at least one lens and the optical path remains fixed between the at least one lens and the array.

* * * * *